(12) United States Patent
Kuperman

(10) Patent No.: US 11,965,561 B2
(45) Date of Patent: Apr. 23, 2024

(54) INNER DRUM

(71) Applicant: 02;RevMax Performance, LLC, Charlotte, NC (US)

(72) Inventor: Frank C. Kuperman, Charlotte, NC (US)

(73) Assignee: RevMax Performance, LLC, Charlotte, NC (US)

( * ) Notice: Subject to any disclaimer, the term of this patent is extended or adjusted under 35 U.S.C. 154(b) by 0 days.

(21) Appl. No.: 18/073,855

(22) Filed: Dec. 2, 2022

(65) Prior Publication Data
US 2023/0175557 A1    Jun. 8, 2023

Related U.S. Application Data

(60) Provisional application No. 63/285,616, filed on Dec. 3, 2021.

(51) Int. Cl.
*F16D 13/62* (2006.01)
*F16D 13/68* (2006.01)

(52) U.S. Cl.
CPC ........... *F16D 13/62* (2013.01); *F16D 13/683* (2013.01)

(58) Field of Classification Search
CPC .............................. F16D 13/62; F16D 13/683
See application file for complete search history.

(56) References Cited

U.S. PATENT DOCUMENTS

| | | | |
|---|---|---|---|
| 7,150,347 B2 * | 12/2006 | Doherty | F16D 13/683 192/112 |
| 8,579,097 B2 | 11/2013 | Kanai et al. | |
| 9,528,557 B1 * | 12/2016 | Heitzenrater | F16D 25/10 |
| 9,719,579 B2 | 8/2017 | Torii et al. | |
| 10,948,059 B2 | 3/2021 | Hardin | |
| 2013/0008757 A1 | 1/2013 | Mizuno et al. | |

* cited by examiner

*Primary Examiner* — Huan Le
(74) *Attorney, Agent, or Firm* — Seth L. Hudson; Maynard Nexsen PC

(57) ABSTRACT

An inner drum that includes a coupling part having an external surface and an internal surface, wherein the internal surface contains splines. An annular trough is engaged to the exterior surface of the coupling part. A circular wall contains a plurality of appendages extending upward from the circular wall. At least one slot is disposed within the appendages for receiving a snap ring.

15 Claims, 6 Drawing Sheets

INNER DRUM

CROSS-REFERENCE TO RELATED APPLICATION

The present patent application claims the benefit of priority of U.S. Provisional Application No. 63/285,616, filed on Dec. 3, 2021, and entitled "INNER DRUM," the contents of which are incorporated in full by reference herein.

FIELD OF THE INVENTION

The present invention relates generally to an inner drum and more generally relates to an inner drum with a structural design that does not suffer the deficiencies of the prior art and allow the inner drum to accommodate additional clutches.

BACKGROUND OF THE INVENTION

An automobile transmission is equipped with multiple clutches that include an inner drum. The inner drum is generally cylindrical that is coupled to an input shaft that receives torque from the engine of the automobile. At least one pressure plate is engaged to the inner drum with the use of snap rings that engage into snap ring groves on teeth, phalanges, or appendices on the inner drum.

BRIEF SUMMARY OF THE INVENTION

According to an embodiment of the present invention, an inner drum includes a coupling part having an external surface and an internal surface, wherein the internal surface contains splines. An annular trough is engaged to the exterior surface of the coupling part. A circular wall contains a plurality of appendages that extend upward from the circular wall. At least one slot is disposed within the appendages for receiving a snap ring.

According to another embodiment of the present invention, the inner drum includes a rib structure, wherein a portion of the rib structure includes the appendages.

According to yet another embodiment of the present invention, the inner drum includes a lip disposed between the circular wall and the annular trough.

According to yet another embodiment of the present invention, the inner drum includes two spaced-apart slots disposed within the appendages for receiving a snap ring.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
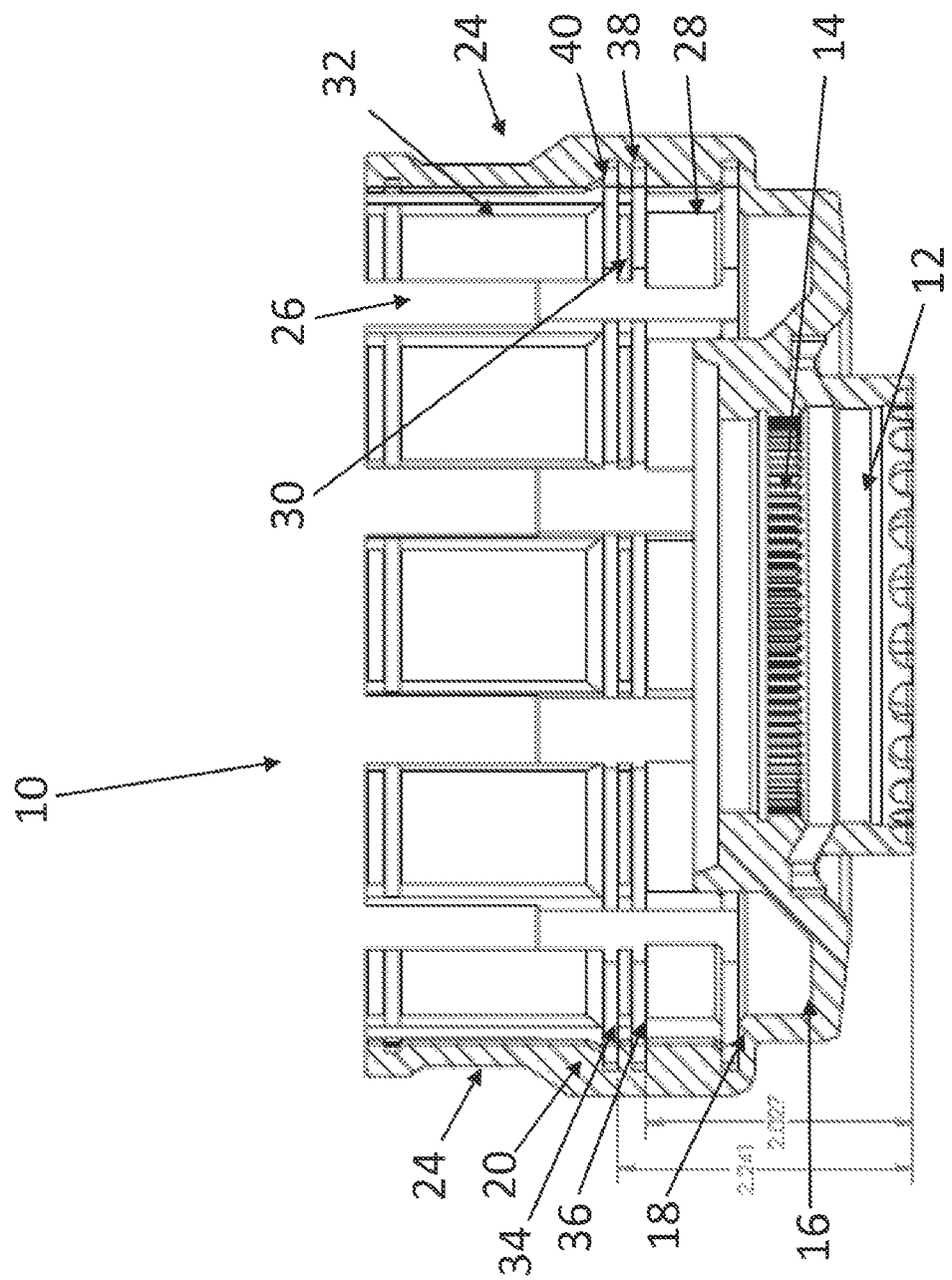
FIG. 1 is a cut-away view of the inner drum of the present invention.
Figure 2:
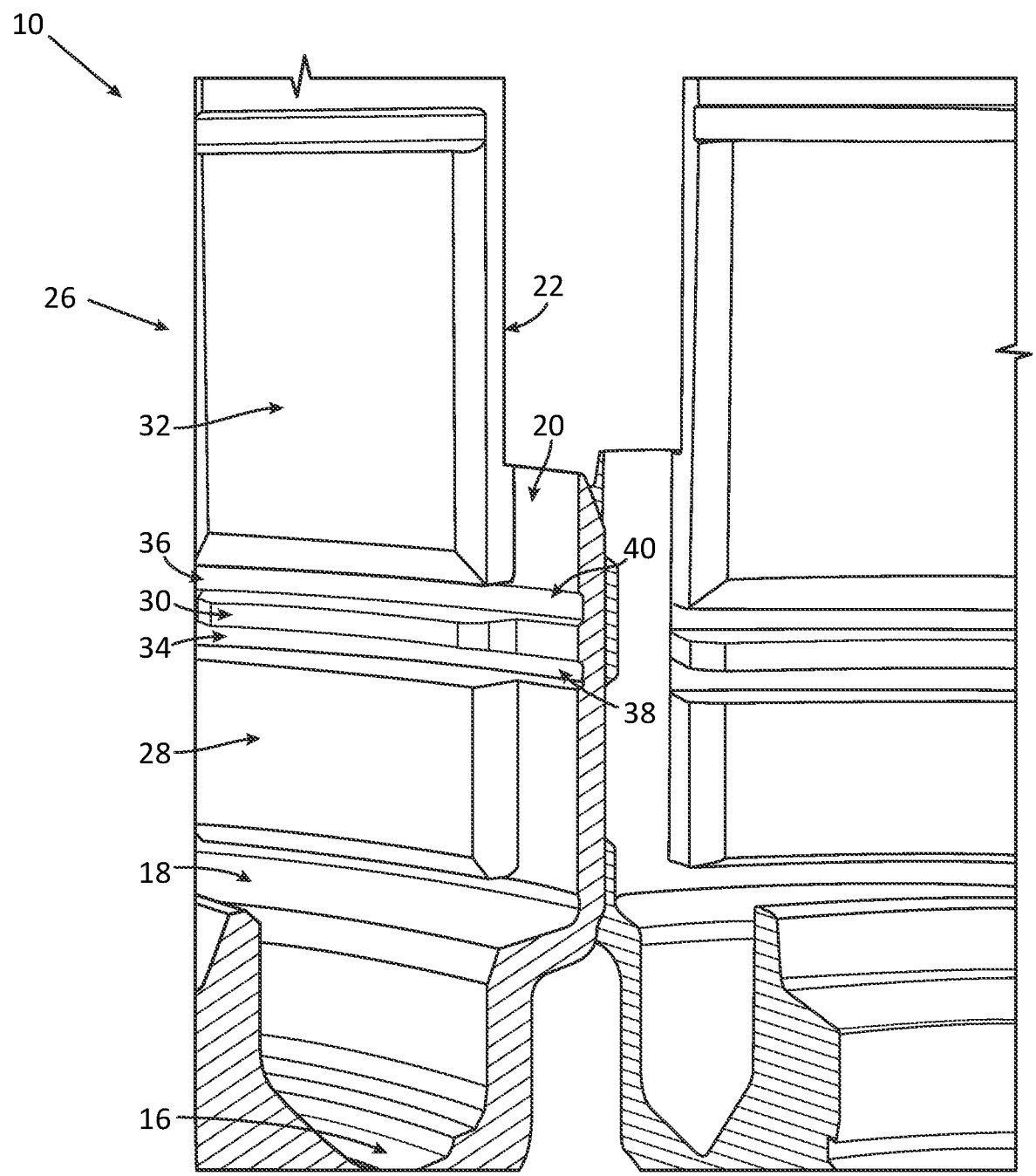
FIG. 2 is a picture showing a portion of two inner drums side-by-side.
Figure 3:
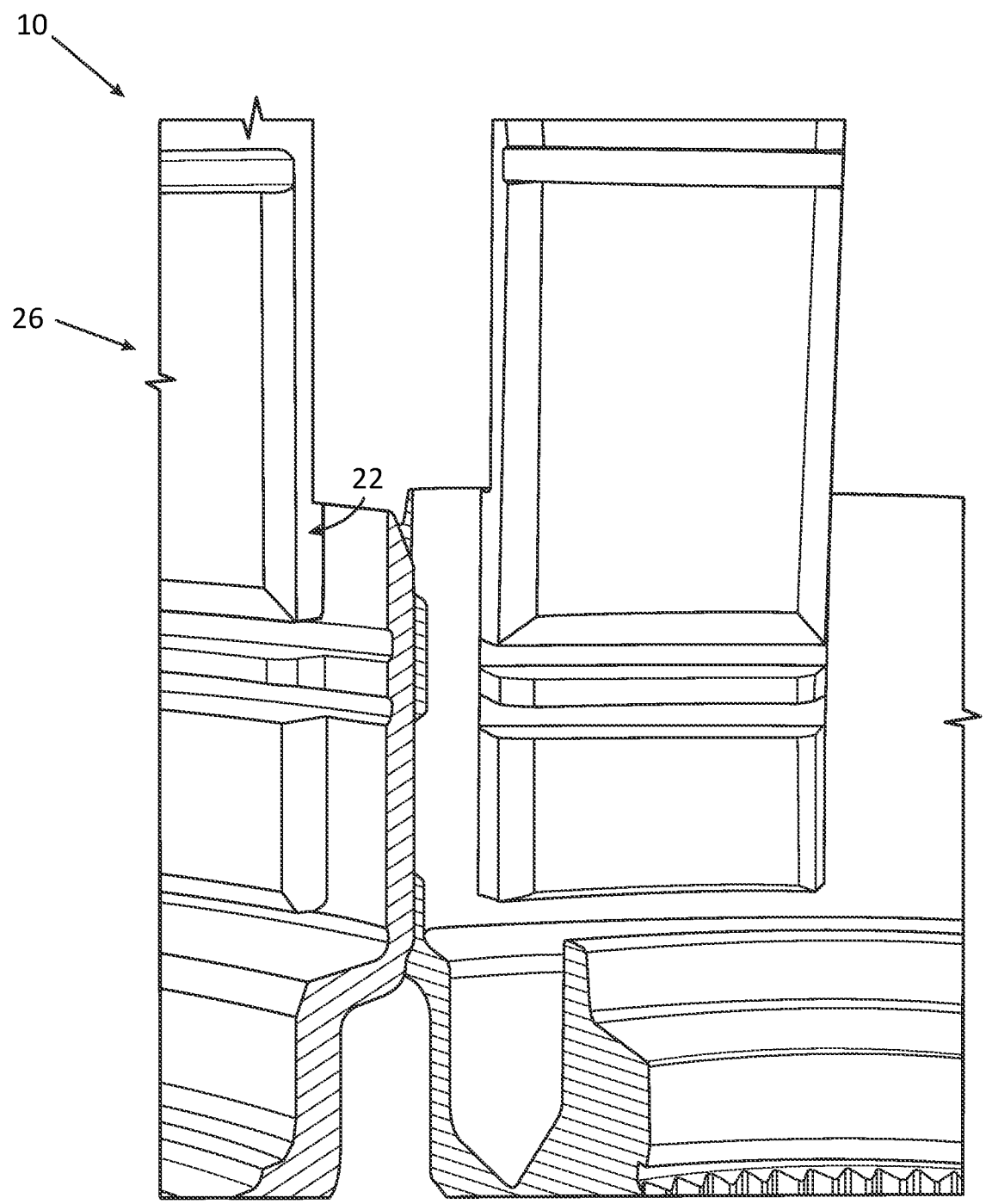
FIG. 3 is another picture showing a portion of two inner drums side-by-side.

Referring now specifically to the drawings, an inner drum is illustrated in FIG. 1 and is shown generally at reference numeral 10. The inner drum 10 is a generally cylindrical member that is substantially open on one end and substantially closed on the other end. The inner drum 10 consists of a coupling part 12 disposed on the substantially closed end of the inner drum 10. The coupling part 12 has internal splines 14 that engage external splines formed on the outside of an input shaft that extends from an engine (not shown). The top edge of the coupling part 12 contains a frustoconical edge transitioning into an annular trough 16 surrounding the outer circumference of the coupling part 12.

Figure 4:
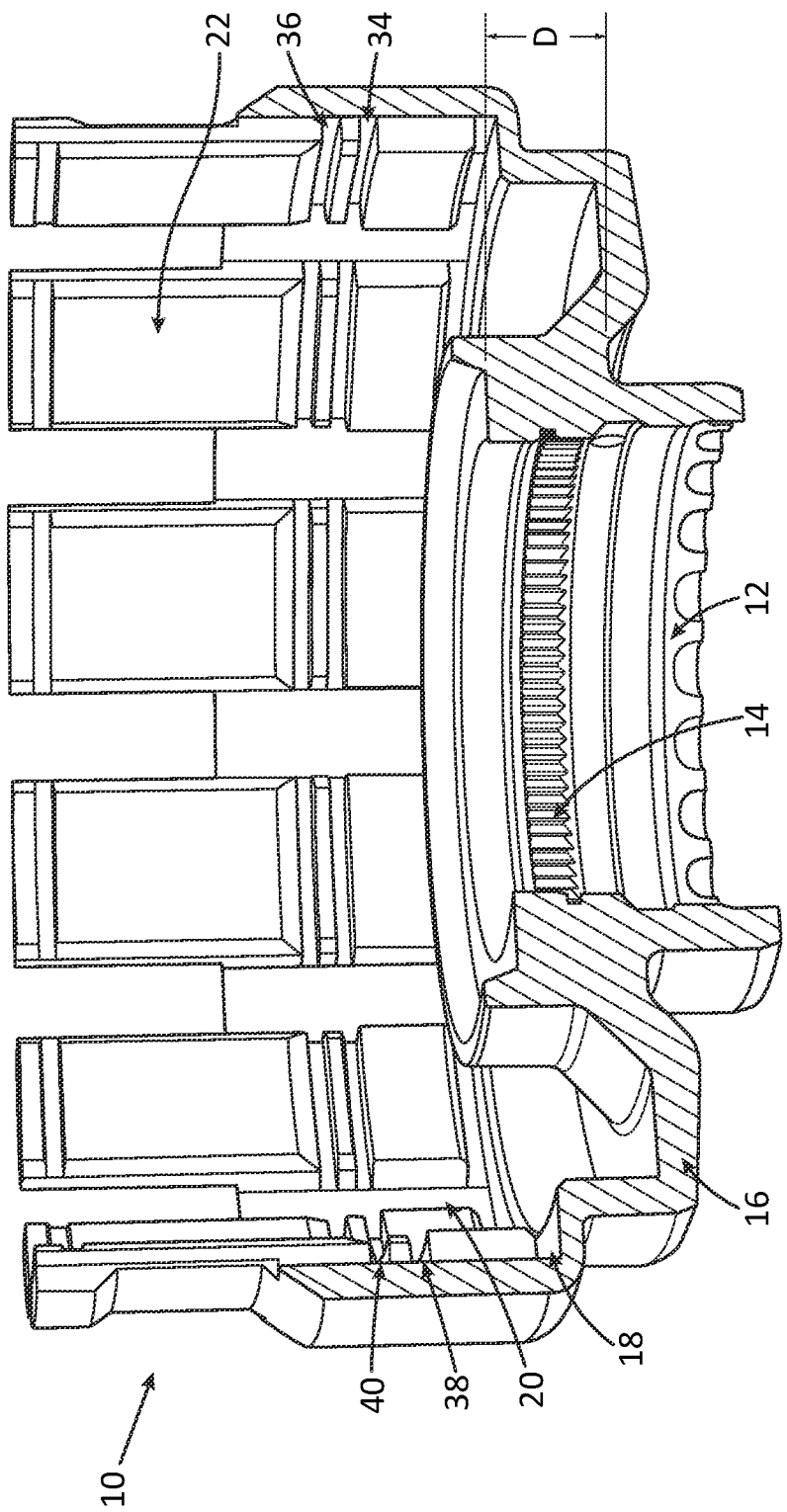
FIG. 4 is a picture of an inner drum of the present invention that has been cut in the axial direction.
Figure 5:
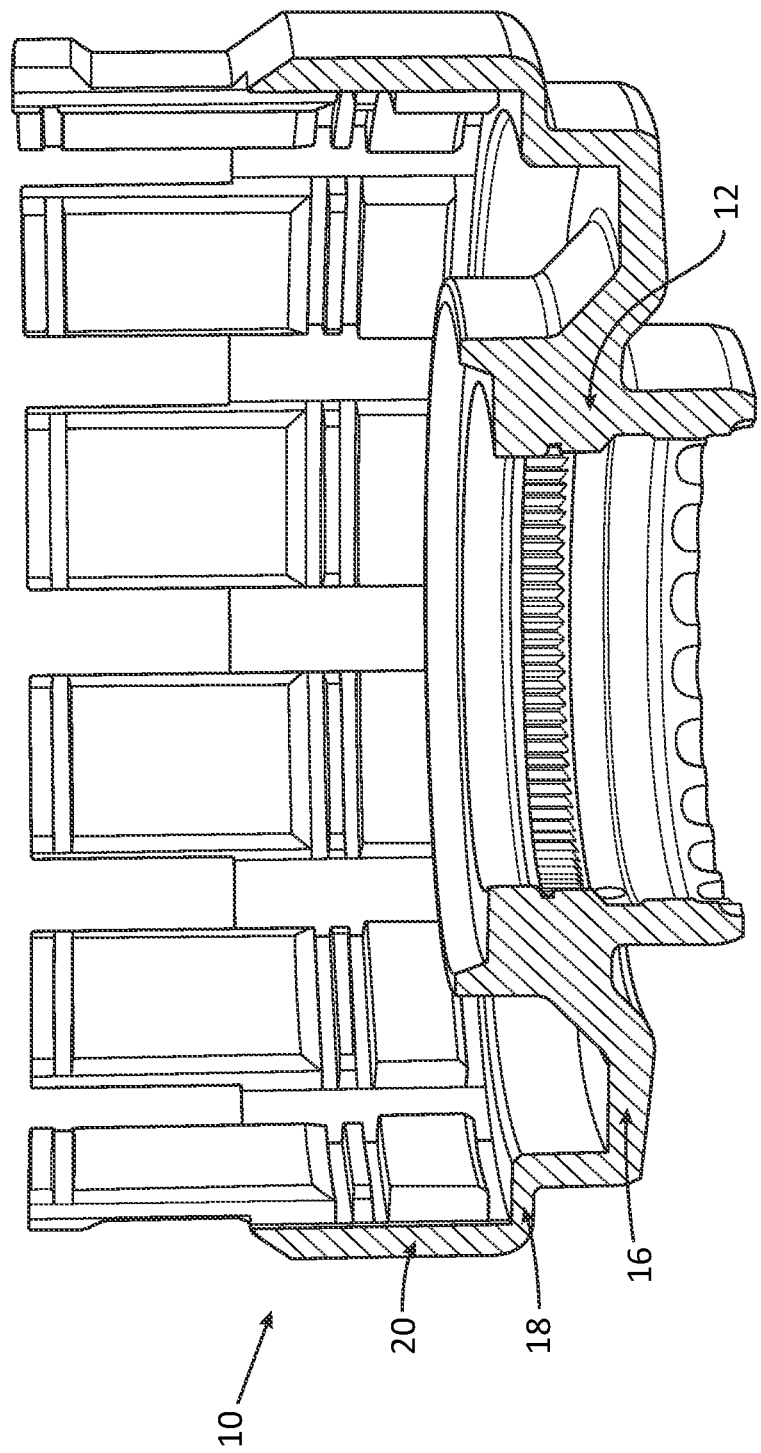
FIG. 5 is a cut-away view of an inner drum of the present invention.

The annular trough 16 is substantially u-shaped or c-shaped containing a first side portion, a second side portion, and a bottom portion. The annular trough 16 extends from the bottom portion to the first side portion in one direction. The first side portion engages the external surface of the coupling part 12. The bottom edge extends in the other direction, opposite the first side portion, to the second side portion. The first side portion and the second side portion are spaced-apart and opposed, separated by the bottom portion. The first side portion extends downward from the frustoconical edge of the coupling part 12 in the axial direction mirroring the external surface of the coupling part 12. At a distance "d", as shown in FIG. 4, the first side portion extends angularly towards the bottom portion and is no longer engaged to the external surface of the coupling part 12. The second side portion extends upward from the bottom portion, wherein the upper edge of the second side portion is engaged to an inner edge of a lip 18 extending outward in the axial direction.

The lip 18 is adjacent the upper edge of the second side portion and extends circumferentially around the annular trough 16. The interior surface of the lip 18 and the upper edge of the second side portion of the annular trough 16 define a flat surface that encircles the interior side of the inner drum 10.

A circular wall 20 extends upwardly from the outer edge of the lip 18. The circular wall 20 contains a plurality of spaced-apart appendages 22 extending upwards in the axial direction and containing a void between each appendage 22. The circular wall 20 has a main body with a circular shape that completely encircles the interior of the inner drum 10 forming a cavity therein. Periodically, an appendage 22 extends upwardly in the longitudinal direction along the circumference of the main body with a void separating each appendage 22. The appendage 22 is a portion of a rib structure 26 disposed periodically along the interior surface of the circular wall 20. The rib structure 26 includes a lower rib portion 28, an intermediate rib portion 30, and upper rib portion 32. The lower rib portion 28 and intermediate rib portion 30 extend outwardly in the lateral direction from the interior surface of the circular wall 20, and separated by a first slot 34. The upper rib portion 32 contains a lower end that extends outwardly in the lateral direction from the interior surface of the circular wall 20 and the remainder of the upper rib portion 32 is the appendage 22. The intermediate rib portion 30 and the upper rib portion 32 are separated by a second slot 36. The appendages 22 are circumferentially arranged in multiple locations in such a manner that the rib structures 26 extend in the radial direction and are adjacently aligned in the circumferential direction.

The main body of the circular wall 20 has a thickness that is constant along the length of the main body. At the upper end of the main body, the thickness gradually decreases to an upper edge of the main body. The appendages 22, which also serve as the upper rib portion 32 extend upwardly from the interior surface of the circular wall 20. The bottom portion and opposed side portion of each appendage 22 is preferably beveled. Towards the top portion of each appendage 22, the thickness increases forming a knob at the top portion of each appendage 22.

Each rib structure 26 contains a first slot 34 and a second slot 36 that are preferably aligned axially on the main body of the circular wall 20. A first channel 38 is positioned within the interior surface of the main body of the circular wall and is continuous along the interior surface and coincides with the first slot 34. In other words, the first channel 38 is located within the first slot 34 of each rib structure 26. A second channel 40, spaced apart and parallel to the first channel 38, is positioned within the interior surface of the main body of the circular wall and is continuous along the interior surface and coincides with the second slot 36. In other words, the second channel 40 is located within the second slot 36 of each rib structure 26. The plurality of first slots 34 within the plurality of rib structures 26, along with the first channel 38, form a first snap ring groove. The plurality of second slots 36 within the plurality of rib structures 26, along with the second channel 40, form a second snap ring groove. Snap rings are placed within the first snap ring groove and the second snap ring groove to maintain clutch plates within the clutch drum in a manner that is understood by those skilled in the art.

During use, clutch plates and clutch disks (not shown) are arranged within the inner drum 10 so as to alternate in the axial direction. The outside peripheries of the clutch plates have a plurality of teeth formed thereon. These teeth of the clutch plates mate with the rib structures 26 of the inner drum 10 so that the clutch plates can move freely in the axial direction, but cannot rotate relative to the inner drum 10.

Figure 6:
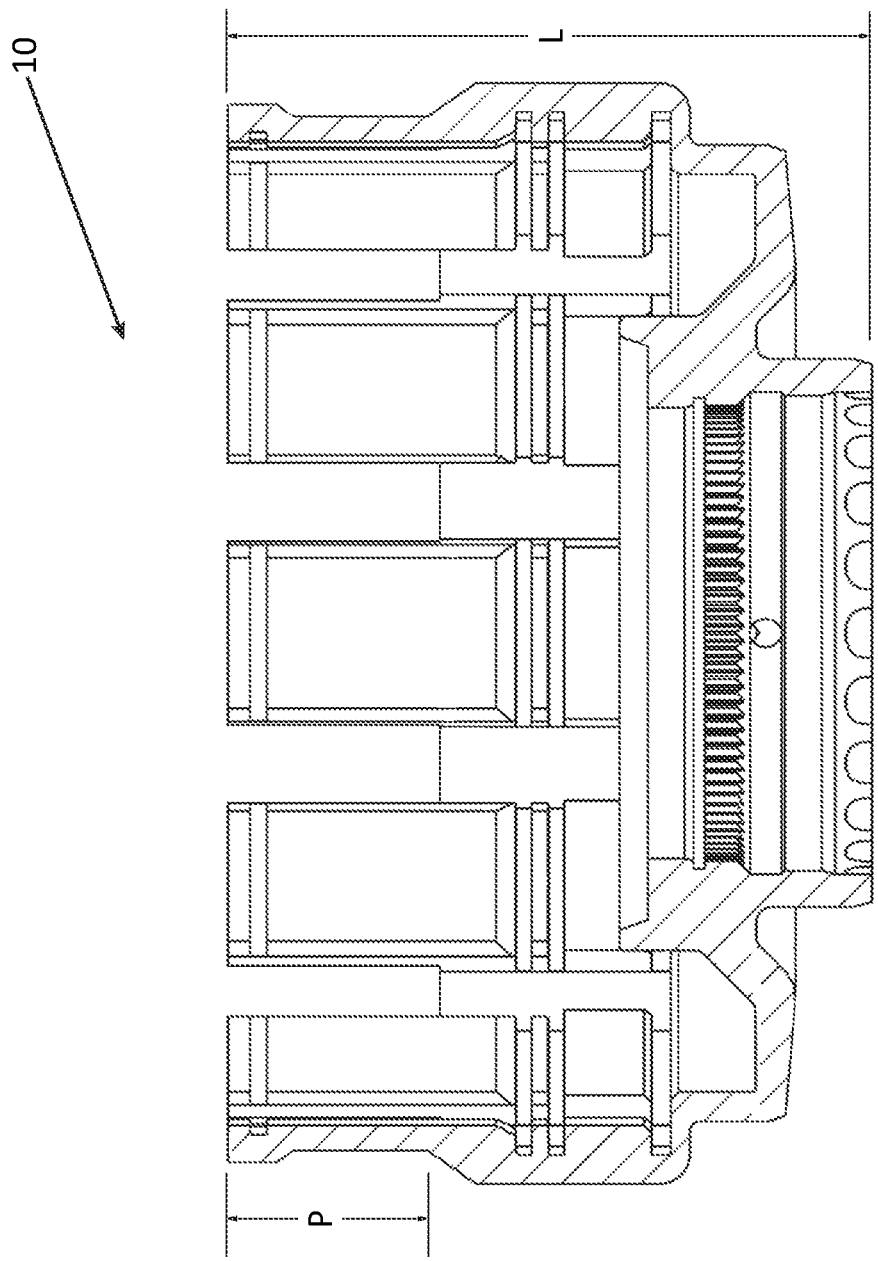
FIG. 6 is another cut-away view of an inner drum of the present invention.

The length referenced as "L" in FIG. 6 is preferably 4.245" that represents the entire length of the inner drum 10. The length referenced as "P" in FIG. 6 is preferably 2.795" that represents the length of the upper rib portion above the upper edge of the circular wall 20. The prior art inner drum has a length of 4.145" and length referenced as "P" of 2.695". The diameter of the inner drum 10 from the exterior surface of the circular wall 20 is 6.8" and the diameter of the inner drum 10 from the interior surface of the circular wall 20 is 6.628" as shown in FIG. 6.

The inner drum 10 is preferably composed of steel, and more preferably composed of 1045 steel. This design is an improvement over the prior art that is composed of aluminum. The aluminum designs of the prior art deteriorate or undergo deformation, when metal parts contact the aluminum design of the prior art. For example, the splines of the prior art strip during use. The deficiencies of the prior art are not experienced with the steel construction of the present invention. Further, the present invention allows the inner drum to accommodate four more clutches than the prior art. The inner drum 10 of the present invention is preferably one-piece, meaning it is formed from a single piece of steel and do not consist of two or more parts engaged together.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An inner drum, comprising:
a coupling part having an external surface and an internal surface, wherein the internal surface contains splines;
an annular trough engaged to the external surface of the coupling part having a first side portion, a second side portion, and a bottom portion, the first side portion and the second side portion are spaced-apart and opposed, separated by the bottom portion;
a circular wall contains a plurality of spaced-apart rib structures extending in an axial direction, the circular wall contains a main body with a circular shape and contains an interior surface; and
a first snap ring groove composed of a first channel within the interior surface of the main body of the circular wall that is continuous along the interior surface and aligns with a plurality of first slots within each rib structure for receiving a first snap ring, and a second snap ring groove composed of a second channel within the interior surface of the main body of the circular wall that is continuous along the interior surface and aligns with a plurality of second slots within each rib structure for receiving a snap ring.

2. The inner drum according to claim 1, wherein the plurality of spaced-apart rib structures contain a lower rib portion, an intermediate rib portion, and an upper rib portion, a void is disposed between each upper rib portion.

3. The inner drum according to claim 2, wherein the lower rib portion and the intermediate rib portion extend outwardly in a lateral direction from the interior surface of the circular wall.

4. The inner drum according to claim 2, wherein the intermediate rib portion and the upper rib portion are separated by the second slot.

5. The inner drum according to claim 1, further including a lip disposed between the circular wall and the annular trough.

6. The inner drum according to claim 1, wherein the inner drum is composed of steel.

7. The inner drum according to claim 1, wherein the inner drum is composed of 1045 steel.

8. An inner drum, comprising:
a coupling part having an external surface and an internal surface, wherein the internal surface contains splines;
an annular trough engaged to the external surface of the coupling part having a first side portion, a second side portion extending to an upper edge, and a bottom portion, the first side portion and the second side portion are spaced-apart and opposed, separated by the bottom portion;
a lip with an outer edge disposed adjacent the upper edge of the second side portion extending circumferentially around the annular trough containing an interior surface, the interior surface of the lip and the upper edge of the second side portion of the annular trough define a flat surface;
a circular wall extending from the outer edge of the lip contains a plurality of spaced-apart rib structures extending in an axial direction and containing a void between each rib structure, the circular wall contains a main body with a circular shape and an interior surface; and
a plurality of first slots within each rib structure for receiving a first snap ring, and a plurality of second slots within each rib structure for receiving a second snap ring.

9. The inner drum according to claim 8 further comprising a first channel positioned within the interior surface of the main body of the circular wall that is continuous along the interior surface of the main body.

10. The inner drum according to claim 9, further comprising a second channel spaced apart and parallel to the first channel positioned within the interior surface of the main body of the circular wall that is continuous along the interior surface of the main body.

11. The inner drum according to claim 8, wherein the inner drum is composed of steel.

12. The inner drum according to claim 8, wherein the inner drum is composed of 1045 steel.

13. The inner drum according to claim 8, wherein the plurality of spaced-apart rib structures contains a lower rib portion, an intermediate rib portion, and an upper rib portion, the lower rib portion and the intermediate rib portion extend laterally outward from the interior surface of the circular wall.

14. The inner drum according to claim 8, wherein a portion of the rib portion extends laterally outward from the interior surface of the circular wall.

15. The inner drum according to claim 8, wherein the inner drum consists of a single integral piece and not composed of two or more parts engaged together.

* * * * *